US010356552B1

(12) United States Patent
Anders et al.

(10) Patent No.: US 10,356,552 B1
(45) Date of Patent: Jul. 16, 2019

(54) DETERMINING HARDWARE REQUIREMENTS FOR A WIRELESS NETWORK EVENT USING CROWDSOURCING

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/136,568

(22) Filed: Sep. 20, 2018

(51) Int. Cl.
*H04W 4/021* (2018.01)
*H04W 64/00* (2009.01)
(Continued)

(52) U.S. Cl.
CPC ........... *H04W 4/022* (2013.01); *H04W 24/08* (2013.01); *H04W 28/0226* (2013.01);
(Continued)

(58) Field of Classification Search
None
See application file for complete search history.

(56) References Cited

U.S. PATENT DOCUMENTS 9,402,188 B2   7/2016  Sofman et al.
2013/0078925 A1*  3/2013  Aguirre ............... H04W 4/021
                                                                              455/62
(Continued)

FOREIGN PATENT DOCUMENTS

WO        2017176248        10/2017

OTHER PUBLICATIONS

Wang et al., "A Data-Driven Architecture for Personalized QoE Management in 5G Wireless Networks", IEEE Wireless Communications, vol. 24, Issue: 1, Feb. 2017, 9 pages.
(Continued)

*Primary Examiner* — German Viana Di Prisco
(74) *Attorney, Agent, or Firm* — Michael O'Keefe; Andrew D. Wright; Roberts Mlotkowski Safran Cole & Calderon, P.C.

(57) ABSTRACT

Systems and methods for determining hardware requirements for a wireless network event are disclosed. In embodiments, a method comprises obtaining, by a computing device, social user data over a period of time from a plurality of mobile devices associated with a social event at a location; obtaining, by the computing device, bandwidth usage data for each of the plurality of mobile devices based on the social user data; obtaining, by the computing device, crowd density and traffic pattern data related to the social event; determining, by the computing device, participant movement data for the social event based on the crowd density and traffic pattern data; deriving, by the computing device, a social bandwidth density model based on the bandwidth usage data and the participant movement data; and determining, by the computing device, bandwidth requirements within a geo-spatial boundary associated with the social event from the social bandwidth density model.

20 Claims, 9 Drawing Sheets

(51) Int. Cl.
*H04W 72/04* (2009.01)
*H04W 28/20* (2009.01)
*H04W 28/02* (2009.01)
*H04W 24/08* (2009.01)

(52) U.S. Cl.
CPC ......... *H04W 28/20* (2013.01); *H04W 64/006* (2013.01); *H04W 72/0486* (2013.01)

(56) References Cited

U.S. PATENT DOCUMENTS

| | | | | |
|---|---|---|---|---|
| 2015/0036494 | A1* | 2/2015 | Kotecha | H04W 4/06 370/235 |
| 2016/0021578 | A1* | 1/2016 | Bostick | H04W 36/26 370/332 |
| 2017/0150365 | A1* | 5/2017 | Goswami | H04W 16/18 |
| 2017/0176202 | A1* | 6/2017 | Anderson | G01C 21/3492 |
| 2017/0265104 | A1* | 9/2017 | Arslan | H04W 24/02 |
| 2017/0286036 | A1* | 10/2017 | Wong | G06F 3/1292 |
| 2018/0352386 | A1* | 12/2018 | Gunasekara | H04W 4/043 |

OTHER PUBLICATIONS

Anh, "Algorithms and Optimization for Quality of Experience Aware Routing in Wireless Networks: From Centralized Solutions", Theses, UniversitéRennes, 2017, 185 pages.

Biral et al., "The challenges of M2M massive access in wireless cellular networks", http://www.sciencedirect.com/science/article/pii/S235286481500005X, ScienceDirect, Department of Information Engineering of the University of Padova, Mar. 27, 2015, 19 pages.

Bangerter et al., "Networks and Devices for the 5G Era", http://tarjomefa.com/wp-content/uploads/2016/09/5296-English.pdf, IEEE Communications Magazine, Feb. 2014, 7 pages.

Goicochea, "Building Smart Cities through Location-based Technology", http://blog.mocaplatform.com/building-smart-cities-through-proximity-beacon-and-geolocation-technology/#.WUwyYhPys6g, MOCA Blog, Dec. 2, 2016, 6 pages.

Miah et al., "Superallocation and Cluster-Based Cooperative Spectrum Sensing in 5G Cognitive Radio Network", https://cdn.intechopen.com/pdfs-wm/52937.pdf, INTECH, Dec. 14, 2016, 23 pages.

Anonymous, "5G Challenges", https://www.tutorialspoint.com/5g/5g_challenges.htm, accessed Sep. 19, 2018, 4 pages.

Cranz, "The Future of Super-Fast 5G Internet Is a Mess", http://gizmodo.com/the-future-of-super-fast-5g-internet-is-a-mess-1792648410, Gizmodo, Mar. 1, 2017, 4 pages.

Best, "The race to 5G: Inside the tight for the future of mobile as we know it", http://www.techrepublic.com/article/does-the-world-really-need-5g/, TechRepublic, accessed Sep. 19, 2018, 15 pages.

Oreskovic, "Google tests waters for potential ultra-fast wireless service", http://www.reuters.com/article/us-google-wireless-idUSKCN0I42TN20141015, Reuters, Oct. 15, 2014, 5 pages.

List of IBM Patents or Patent Applications Treated as Related, May 23, 2019, 1 page.

Specification "Determining Hardware Requirements for a Wireless Network Event Using Crowdsourcing" and Drawings in U.S. Appl. No. 16/418,413, filed May 21, 2019, 38 pages.

* cited by examiner

DETERMINING HARDWARE REQUIREMENTS FOR A WIRELESS NETWORK EVENT USING CROWDSOURCING

BACKGROUND

The present invention relates generally to wireless network systems and, more particularly, to determining hardware requirements for a wireless network event using crowdsourcing.

Different generations of wireless technology are defined by their data transmission needs. Like other cellular networks, fifth generation or 5G wireless technology utilizes a system of cell sites (e.g., utilizing macro cells or small cells) that divide a territory into sectors, and sends encoded data through radio waves. In general, macro cells or macro cell antennas are used in cellular networks with the function of providing radio coverage to a large area of mobile network access. Macro cell antennas (e.g., master base stations) are generally mounted on ground-based masts, rooftops, or existing structures having a clear view of the surroundings. In general, small cells or small cell antennas comprise low-powered cellular radio access nodes that are "small" compared to macro cells, and may be in the form of a portable or mobile antenna array or a fixed antenna array.

SUMMARY

In an aspect of the invention, a computer-implemented method includes: obtaining, by a computing device, social user data over a period of time from a plurality of mobile devices associated with a social event at a location; obtaining, by the computing device, bandwidth usage data for each of the plurality of mobile devices based on the social user data; obtaining, by the computing device, crowd density and traffic pattern data related to the social event; determining, by the computing device, participant movement data for the social event based on the crowd density and traffic pattern data; deriving, by the computing device, a social bandwidth density model based on the bandwidth usage data and the participant movement data; and determining, by the computing device, bandwidth requirements within a geo-spatial boundary associated with the social event from the social bandwidth density model.

In another aspect of the invention, there is a computer program product comprising a computer readable storage medium having program instructions embodied therewith. The program instructions are executable by a computing device to cause the computing device to: obtain crowd sourced social user data over a period of time from a plurality of mobile devices associated with a social event at a location, wherein the social user data comprises data regarding the use of digital content for each of the plurality of mobile devices; obtain bandwidth usage data including an amount of bandwidth utilized by each of the plurality of mobile devices during the use of digital content; generate participant movement data for the social event indicating the movement of participants at the location; derive a social bandwidth density model based on the bandwidth usage data and the participant movement data; and determine bandwidth requirements within a geo-spatial boundary associated with the social event from the social bandwidth density model.

In another aspect of the invention, there is a system including: a processor, a computer readable memory and a computer readable storage medium associated with a computing device; program instructions to obtain crowd sourced social user data over a period of time from a plurality of mobile devices associated with a social event at a location, wherein the social user data indicates a manner in which each of the plurality of mobile devices is utilizing bandwidth of a mobile network; program instructions to obtain bandwidth usage data indicating the amount of bandwidth utilized by each of the plurality of mobile devices based on the social user data; program instructions to obtain crowd density and traffic pattern data related to the social event; program instructions to determine participant movement data for the social event based on the crowd density and traffic pattern data; program instructions to derive a social bandwidth density model based on the bandwidth usage data and the participant movement data; and program instructions to determine bandwidth requirements within a geo-spatial boundary associated with the social event from the social bandwidth density model, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
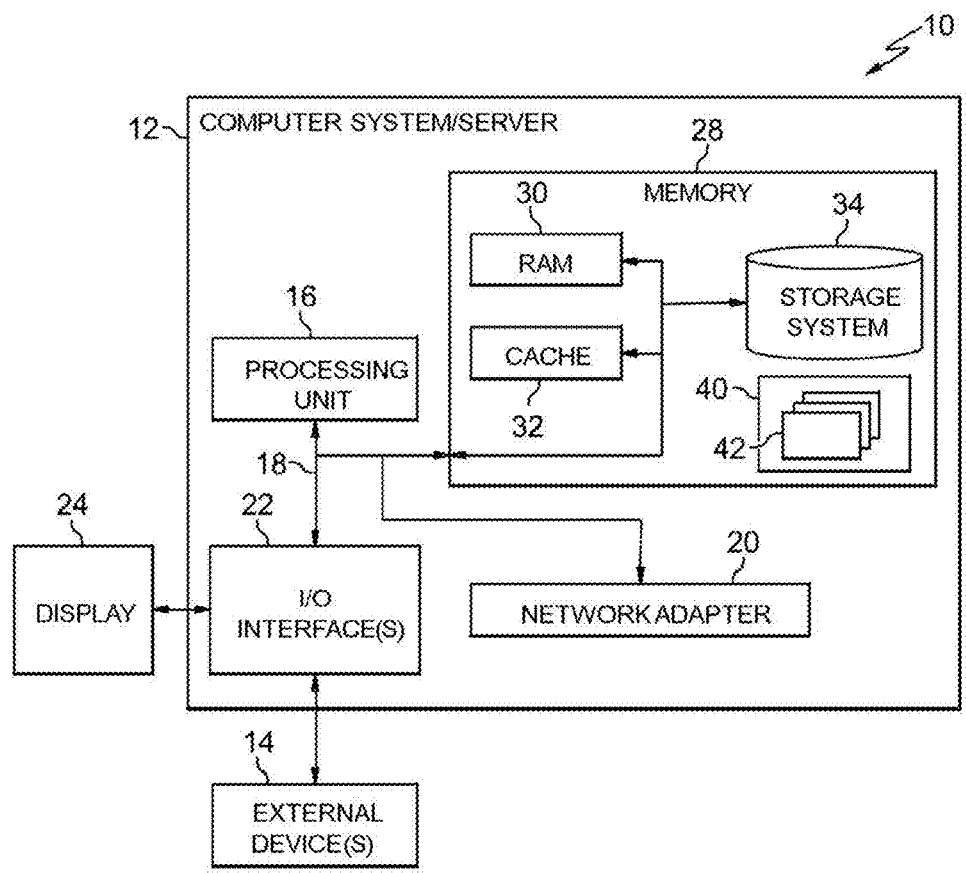
FIG. 1 depicts a computing infrastructure according to an embodiment of the present invention.

The present invention relates generally to wireless network systems and, more particularly, to determining hardware requirements for a wireless network event using crowdsourcing. In embodiments, social user information (e.g., mobile device usage information) is mined by a server to understand the types of activities a user engages in at an event (e.g., outdoor social event). The social footprint of each participant at the event is utilized by the server to understand the types of services and network usage each participant consumers over time. Crowd density and traffic pattern data is mined by the server to understand the movement of participants within a crowd during the event. Using the movement information combined with bandwidth usage data, the server derives a social bandwidth density model (SBDM) as a function of the physical location of the event. The SBDM model is then used to infer Quality of Experience (QoE) requirements within a geo-spatial boundary associated with the event. In general QoE is a user-centric concept concerning the process of human perception and experience, and of quality formation. Parameters effecting QoE may include latency, jitter and wireless signal strength or bandwidth, for example. QoE is dependent on the location of a user (consumer of wireless services). With QoE requirements known, small mobile cell systems (e.g., radio antennas) can be deployed within a known user trajectory (path followed by participant) at the event to meet the needs of participants.

Wireless network carriers face a number of technical challenges when providing developing 5G wireless network access to users. Three core challenges include: inter-cell interference, efficient medium access control, and traffic management. In particular, variations in size of traditional macro cells and concurrent small cells may lead to inter-cell interference. Additionally, in situations where dense deployment of network access points and user terminals are required, user throughput will be low, latency will be high, and hotspots will not be competent to cellular technology to provide high throughput. In such situations, efficient control of medium access is required. Further, in comparison to traditional human to human traffic in cellular networks, a great number of machine to machine (M2M) devices in a cell may cause serious system challenges (i.e., radio access network (RAN) challenges), which may cause overload and congestion of a wireless network system. With shorter transmission frequency comes a concern that the range from mobile device to cell will be much shorter (e.g., hundreds of meters versus kilometers for 5G). While research has been conducted into smaller cells and portable cells, there is little research into the communication requirements for temporal large groups, which may move in a dynamic way over a specified time period.

Existing methods fall short of enabling network cell management systems to infer both bandwidth and crowd density within a location (e.g., outdoor location). Embodiments of the present invention provide a solution to the problems associated with wireless network communication within temporal large groups that move in a dynamic way over time. In aspects, a system of the present invention provides a solution for optimal location of mobile small cell infrastructure to ensure optimal quality of experience (QoE) (e.g., users can access data, data speeds are adequate for a user's needs) within a 5G network. In aspects, a computer-implemented method is provided to: mine social user information to understand the types of activity a user engages in at an event; mine crowd density/traffic pattern data to understand the movement of individuals within a crowd during the event; derive a social bandwidth density model (SBDM); infer QoE requirements within a geo-spatial boundary based on the SBDM; and deploy small mobile cell systems within a known trajectory based on the QoE requirements.

Advantageously, embodiments of the invention negate the costly requirement of having small cells at uniform distances within a geo-spatial boundary, regardless of whether all of the small cells are required or not. Moreover, embodiments of the invention enable adequate access and dissemination of content by mobile users at an event based on crowdsourced data. Accordingly, embodiments of the invention provide improvements in the technical field of wireless network communications. In aspects, unconventional advanced non-linear least squares (NLS) methods are utilized to infer optimal crowd density to address the technical problem of adequate cell coverage in a wireless network. Moreover, in aspects, historic crowd mapping/tracking of prior service usage from past like-themed events is utilized to determine technical needs of a wireless network associated with determined QoE data. Accordingly, methods of the invention utilizes new techniques for analyzing data not previously utilized to generate new data to solve technical problems associated with wireless network usage events.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
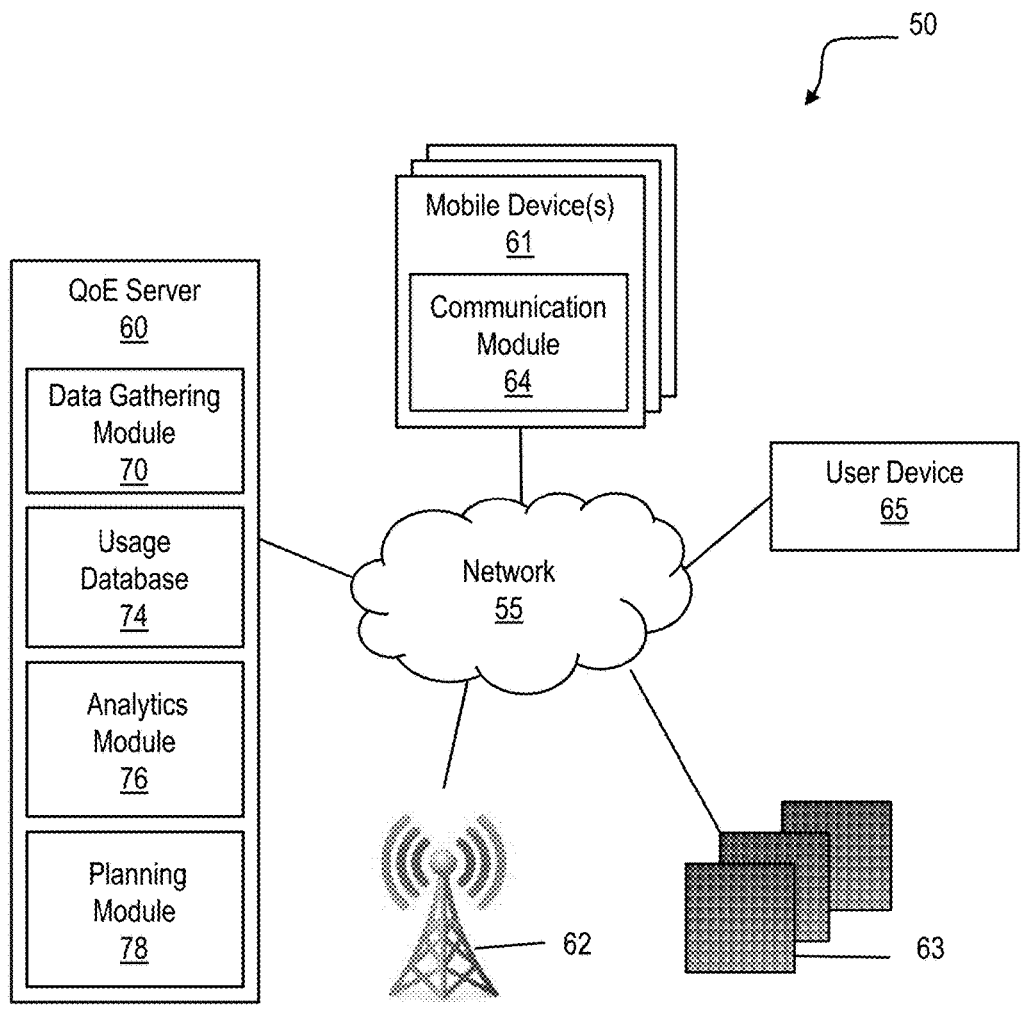
FIG. 2 shows an exemplary environment in accordance with aspects of the invention.

FIG. 2 shows an exemplary wireless networking environment 50 in accordance with aspects of the invention. The wireless networking environment 50 includes a network 55 connecting a Quality of Experience (QoE) server 60 with one or more mobile devices 61. In aspects, the wireless networking environment 50 includes one or more master base stations 62 (e.g., stationary cell antenna) and one or more secondary or mobile base stations 63 (e.g., mobile cell antenna array). In embodiments, the QoE server 60 is in communication with one or more user devices 65, which may comprise hardware provisioning services.

In embodiments, the QoE server 60 comprises a computer system 12 of FIG. 1, connected to the network 55 via the network adapter 20 of FIG. 1. In aspects, the QoE server 60 is configured as a special purpose computing device that is part of a wireless network provider infrastructure. For example, the QoE server 60 may be configured to perform unconventional data analysis and analytics to derive social bandwidth density models (SBDMs) for use in inferring QoE bandwidth requirements for events within specific geo-spatial boundaries.

The network 55 may be any suitable communication network or combination of networks, such as a local area network (LAN), a general wide area network (WAN), and/or a public network (e.g., the Internet). In embodiments, the network 55 is a cellular or mobile network distributed over a plurality of land areas (cells), each served by at least one fixed-location master base station 62 (e.g., base transceiver station or cellular radio tower). In aspects, one or more master base stations 62 are configured to provide a cell(s) with network coverage which can be used for the transmission of voice, data and other types of content. Additionally, the one or more mobile base stations 63 (e.g., mobile massive antenna arrays) provide a cell(s) with additional network coverage which can be used for the transmission of content. In aspects, the network 55 is configured to provide 5G network services to the mobile devices 61. In embodiments, the master base stations 62 and mobile base stations 63 enable a plurality of portable transceivers (mobile devices 61) to communicate with fixed transceivers (e.g., servers, desk top computers, etc.) and mobile devices 61 anywhere in the network 55.

In aspects, the mobile devices 61 include one or more components of the computing device 12, and may be a laptop computer, tablet computer, smartphone, smart wearable device, automotive computing device, or other portable computing device including wireless communication capabilities. In embodiments, one or more of the mobile devices 61 include a communication module 64 enabling wireless communication via the network 55. In aspects, the QoE server 60 is configured to communicate with plural mobile devices 61 simultaneously.

Still referring to FIG. 2, modules of the QoE server 60 are configured to perform one or more of the functions described herein, and may include one or more program modules (e.g., program module 42 of FIG. 1) executed by the QoE server 60. In embodiments, a data gathering module 70 is configured to obtain social user data, crowd density and traffic pattern data, and/or other data relevant to the determination of network usage and participant movement over time for an event. In aspects, the QoE server 60 gathers and stores usage data (e.g., participant data regarding usage of network resources) in a usage database 74 of the QoE server 60. In embodiments, an analytics module 76 of the QoE server 60 is configured to determine bandwidth usage of the mobile devices 61, determine movement of participants (e.g., mobile devices 61) associated with an event, derive a social bandwidth density model (SBDM) from bandwidth and movement data, and infer QoE bandwidth requirements within a geo-spatial boundary associated with the event. In aspects, a planning module 78 is configured to generate and send notifications regarding geographic deployment of one or more mobile base stations 63 to facilitate the transfer of content among participants' mobile devices 61, based on the inferred QoE bandwidth requirements.

In embodiments, the QoE server 60 includes additional or fewer components than those shown in FIG. 2. Separate components may be integrated into a single computing component or module. Additionally, or alternatively, a single component may be implemented as multiple computing components or modules. Moreover, the type and quantity of components in the wireless networking environment 50 is not limited to what is shown in FIG. 2. In practice, the wireless networking environment 50 may include additional devices and/or networks; fewer devices and/or networks; different devices and/or networks; or differently arranged devices and/or networks than illustrated in FIG. 2.

Figure 3:
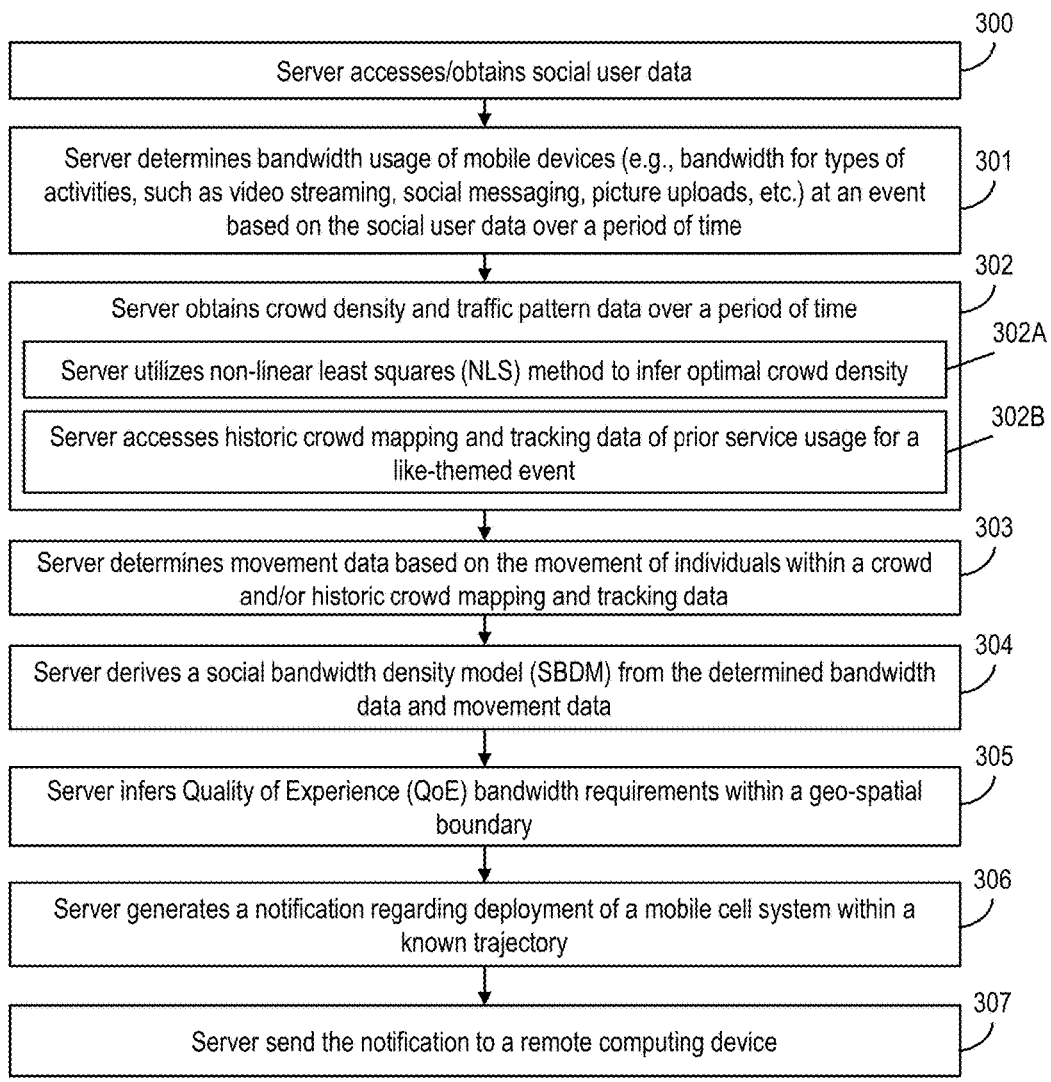
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the QoE server 60 accesses and/or obtains social user data (crowd sourced data) for mobile device activities of a plurality of users (e.g., participants in an event of interest). The term crowd sourced as used herein refers to obtaining information by enlisting the services of a large number of people through a network connection (e.g., internet). In embodiments, step 300 is performed for users associated with a particular event of interest. An event of interest may be, for example, a music concert, a festival, a political event, or other gathering of multiple participants where a wireless network is in use. In aspects, social user data accessed or obtained by the QoE server 60 includes a variety of data enabling the QoE server 60 to understand the types of mobile device activities a user engages in at the event of interest via respective mobile devices 61. The types of activities engaged in by event participants results in a social footprint for each individual, enabling the QoE server 60 to understand the types of wireless network services each individual consumes over time. A variety of tools and methods may be utilized by the QoE server 60 to obtain the social user data. For example, the QoE server 60 may access a software application through an application programming interface (API) to obtain data (e.g., posts per minute). In aspects, the QoE server 60 accesses read/write data of a mobile device 61 to understand activities (e.g., uploaded files, streaming video, etc.) being performed by the mobile device 61. In embodiments, the data gathering module 70 of the QoE server 60 performs step 300. In aspects, the QoE server 60 saves social user data for an event of interest in the usage database 74.

At step 301, the QoE server 60 determines bandwidth usage of mobile devices 61 over time based on the social user data of step 300. Step 301 may be performed in conjunction with step 300. In aspects, the QoE server 60 saves bandwidth data for an event of interest in the usage database 74. In embodiments, the data gathering module 70 of the QoE server 60 determines the bandwidth according to step 301. In aspects, the data gathering module 70 of the QoE server 60 mines social user information of participants associated with the event of interest over a period of time to generate a table of results.

TABLE 1

Social Footprint of Participants

| User | Service | Temporal Usage (minutes) | Bandwidth Used |
| --- | --- | --- | --- |
| John | Video Streaming | 24 | 156 MB |
| Paul | Social Messaging | 45 | 34 MB |
| George | Picture Uploading | 18 | 30 MB |
| Jane | Social Messaging | 36 | 28 MB |

Table 1 represents social user information and bandwidth usage data for four participants at an event over a fixed period of time. In accordance with embodiments of the invention, the QoE server 60 obtains information regarding mobile device activities of the users (e.g., mobile devices 61), including video streaming, social messaging, and picture uploading. In the example of Table 1, a participant John spends a total of 24 minutes during an event streaming digital video data on a mobile device, resulting in a total bandwidth usage of 156 megabytes (MB); a participant Paul spends a total of 45 minutes utilizing a social messaging tool of a mobile device, resulting in a total bandwidth usage of 34 MB; a participant George spends a total of 18 minutes uploading digital picture to a mobile device, resulting in a total bandwidth usage of 30 MB; and a participant Jane spends a total of 36 minutes utilizing a social messaging tool of a mobile device, resulting in a total bandwidth usage of 28 MB.

At step 302, the QoE server 60 obtains crowd density data and traffic pattern data for an event of interest. In aspects, the QoE server 60 saves crowd density data and traffic pattern data for an event of interest in the usage database 74. In aspects, the QoE server 60 obtains global positioning system (GPS) data from a plurality of mobile devices 61 associated with the event of interest (e.g., within predefined geographic area), and utilizes the GPS data to determine crowd density and traffic patterns for the event of interest over time. In embodiments, the data gathering module 70 of the QoE server 60 gathers crowd density data and traffic pattern data in accordance with step 302. A variety of tools and methods may be utilized to determine crowd density data and traffic pattern data over a period of time for an event of interest.

In accordance with substep 302A, in embodiments, the QoE server 60 utilizes a non-linear least squares (NLS) method to infer optimal crowd density for an event. In general, if two or more variable are plotted via a scatter plot, one can determine whether a line or a curve (or series of curves) is the most appropriate method to fit a desired data set. In aspects, the QoE server 60 employs a curve or series of curve functions that has/have the ability to pass as closely as possible through plotted data points (e.g., plotted crowd density and traffic pattern data). The closer the line to the plotted points, the more accurate the estimated values of the line. A distance between an observed value and an estimated value is known as a residual. In aspects, the QoE server 60 is configured to produce the smallest cumulative value of residual errors. Many types of curve functions exist. In aspects, the QoE server 60 utilizes one of the following functions in the implementation of step 302A: quadratic, power, polynomial, rational, exponential, logarithmic or sinusoidal functions.

In accordance with substep 302B, in embodiments, the QoE server 60 accesses historic crowd mapping and tracking data for an event which is similar to the event of interest. In aspects, the QoE server 60 accesses data of a prior event stored in the usage database 74. In embodiments, the QoE server 60 accesses historic crowd mapping and tracking data for a prior event, when the prior event is determined to match one or more parameters of a current event of interest. In aspects, the QoE server 60 determines a match between a current event and a historic event when a threshold is met (e.g., a predetermined number of matching parameters between the current and historic events is determined). In one example, the QoE server 60 determines that a type of event (e.g., music event) and a location (e.g., a music venue) from a prior event in the usage database 74 matches the type of event and location of a current event of interest, and obtains crowd density and traffic pattern data for the prior event, wherein the prior event data is utilized to infer crowd density and traffic patterns for the current event of interest.

Figure 4A:
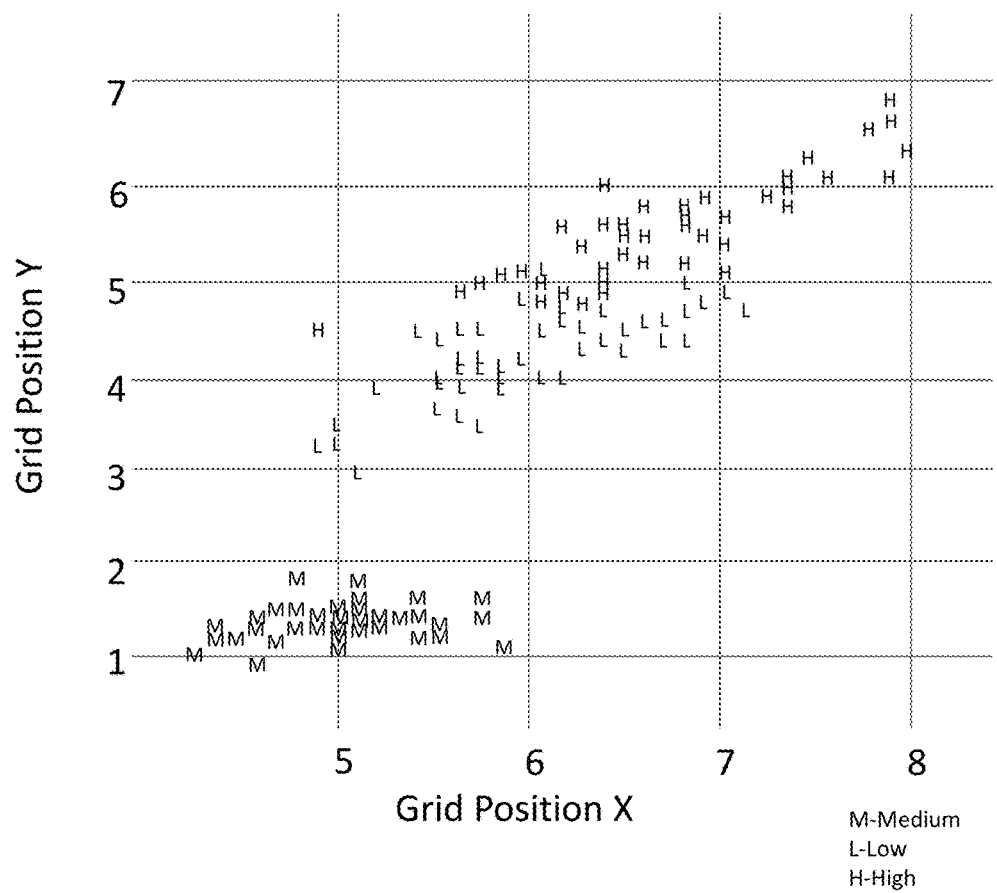
FIG. 4A shows a temporal plot illustrating clusters of high, medium and low bandwidth usage at an event, generated in accordance with embodiments of the invention.

At step 303, the QoE server 60 determines participant movement data (i.e., movement over time) based on the movement of individual participants at an event of interest and/or based on historic crowd mapping and tracking data (e.g., historic data from usage database 74). In aspects, the QoE server 60 generates a temporal plot illustrating cluster groups of users by their bandwidth usage (e.g., high, medium and low usage) along an X/Y positioning system, based on the crowd density and traffic pattern data of step 302. Recognizing that individual users and cohorts of users will move in a pseudo random way over time, aspects of the invention model this migration of users using Brownian motion. One example of a temporal plot generated in accordance with step 303 is illustrated at FIG. 4A, wherein clusters of high, medium and low bandwidth usage are shown.

Figure 4B:
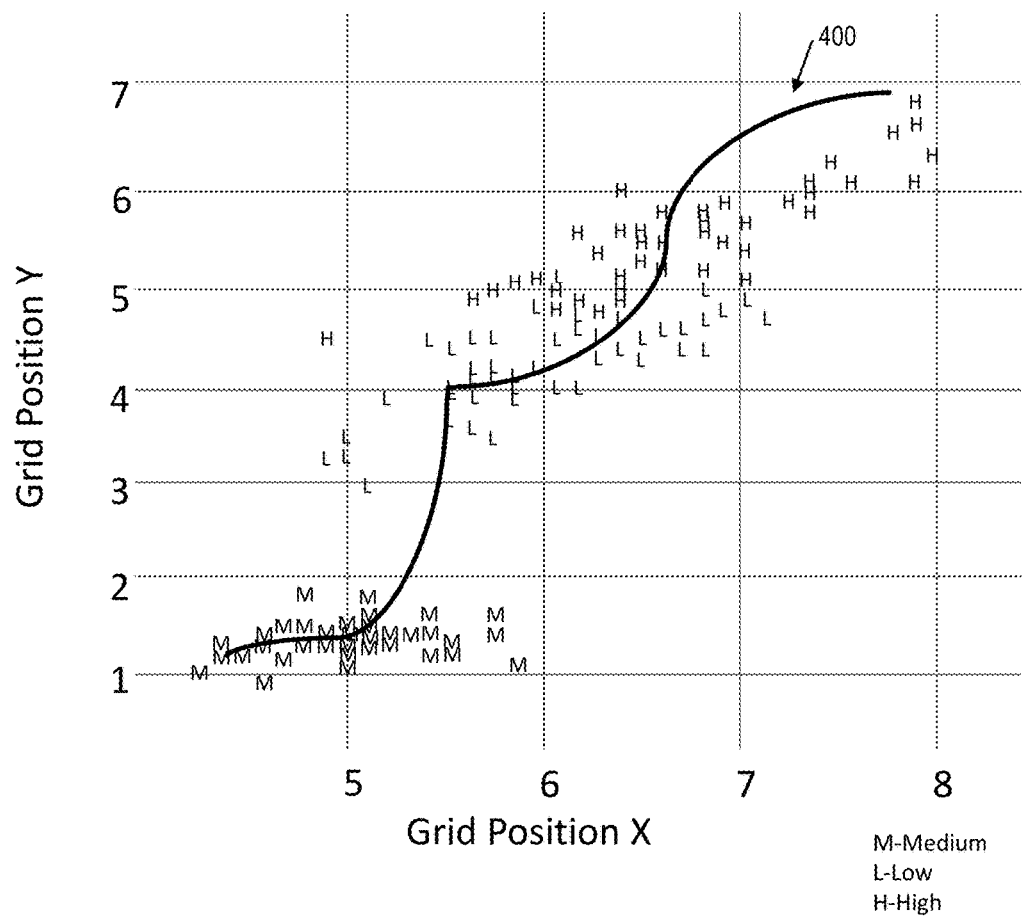
FIG. 4B shows the plot of FIG. 4A, including a Double Gaussian curve fit to user movement data and bandwidth (QoE) requirements of an event, generated in accordance with embodiments of the invention.
Figure 5A:
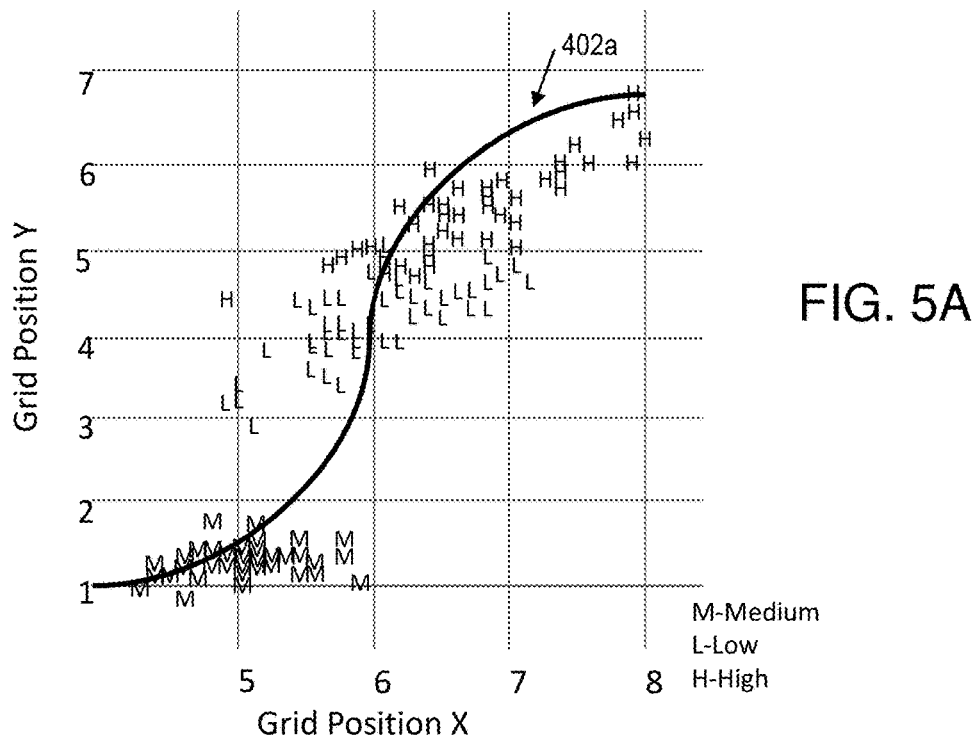
FIGS. 5A-5D illustrate fitted curves computed at regular intervals in accordance with embodiments of the invention.
Figure 5B:
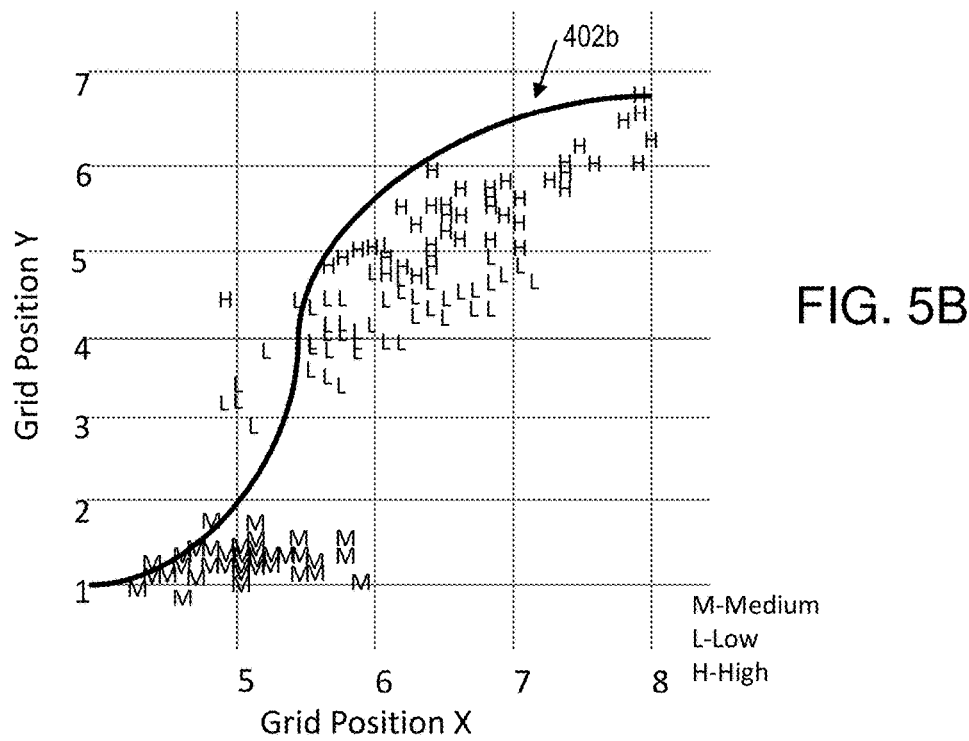
Figure 5C:
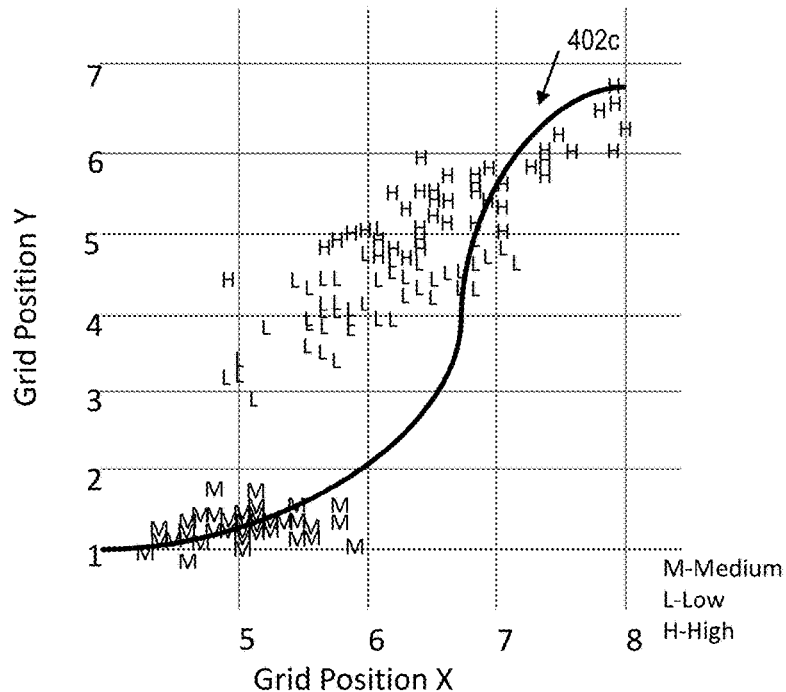
Figure 5D:
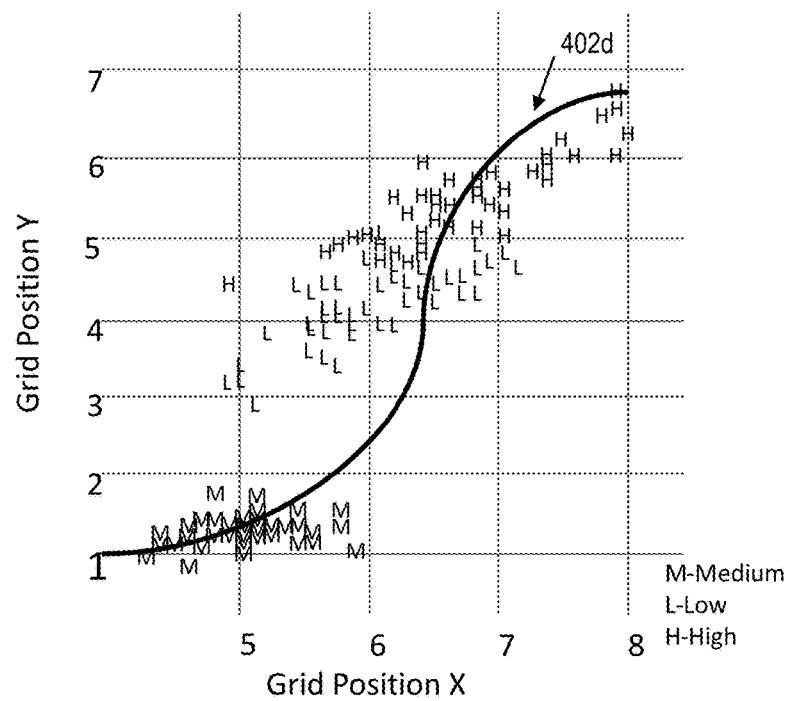

Referencing FIG. 3, at step 304, the QoE server 60 derives a social bandwidth density model (SBDM) from the determined bandwidth data determined at step 301 and movement data determined at step 303. In embodiments, the QoE server 60 uses a non-linear least squares model to plot a fitted curve, giving increased weight fitting to higher bandwidth requirements. In the example of FIG. 4B, the plot of FIG. 4A is shown with a Double Gaussian curve fit 400 to the movement and bandwidth (QoE) requirements of an event. An example of Double Gaussian fitted parameters is illustrated below (using the correlation coefficient (R) to compute the parameters).

$$y \sim (a/b)*\exp(-(x-c)^2/(2*b^2))+(d/e)*\exp(-(x-f)^2/(2*e^2))$$ Nonlinear Regression Model:

Wherein: a=0.3989549; b=0.7500404; c=3.7499843; d=0.3989563; e=0.5000215 and f=6.0000002. The residual sum-of-squares for this example is 1.001.001 e-05.

At step 305 of FIG. 3, the QoE server 60 infers QoE bandwidth requirements within a geo-spatial boundary using the SBDM model of step 304. FIGS. 5A-5D illustrate how an SBDM model is used to infer QoE requirements. In particular, FIGS. 5A-5D illustrate the QoE server 60 generating fitted curves 402a-402d, wherein the fitted curves are computed at regular intervals (illustrated by each of FIGS. 5A-5D) to allow for temporal movement and bandwidth changes during an event. That is, fitted curves 402a-402b differ from one another, as each curve is based on different data as the data changes over the course of the event. FIGS. 5A-5D illustrate the advantage of network cell positions remaining mobile in order to allow for optimal distance between individuals/cohorts and network cell stations at an event. In embodiments, the QoE server 60 plots out optimal locations of one or more network antennas (e.g., mobile base stations 63) using the SBDM model of step 304.

At step 306, the bandwidth requirements inferred at step 305 are utilized by the QoE server 60 to generate a notification. In embodiments, the QoE server 60 generates a notification regarding deployment of mobile cell systems within a known trajectory of the participants. In aspects, the QoE server 60 sends the notification of step 306 to one or more remote user devices 65. The notification may include, for example, any message regarding the optimal or desirable locations of one or more master base station (e.g., 5G base station), or one or more secondary base stations (e.g., portable 5G massive antenna arrays).

Figure 6:
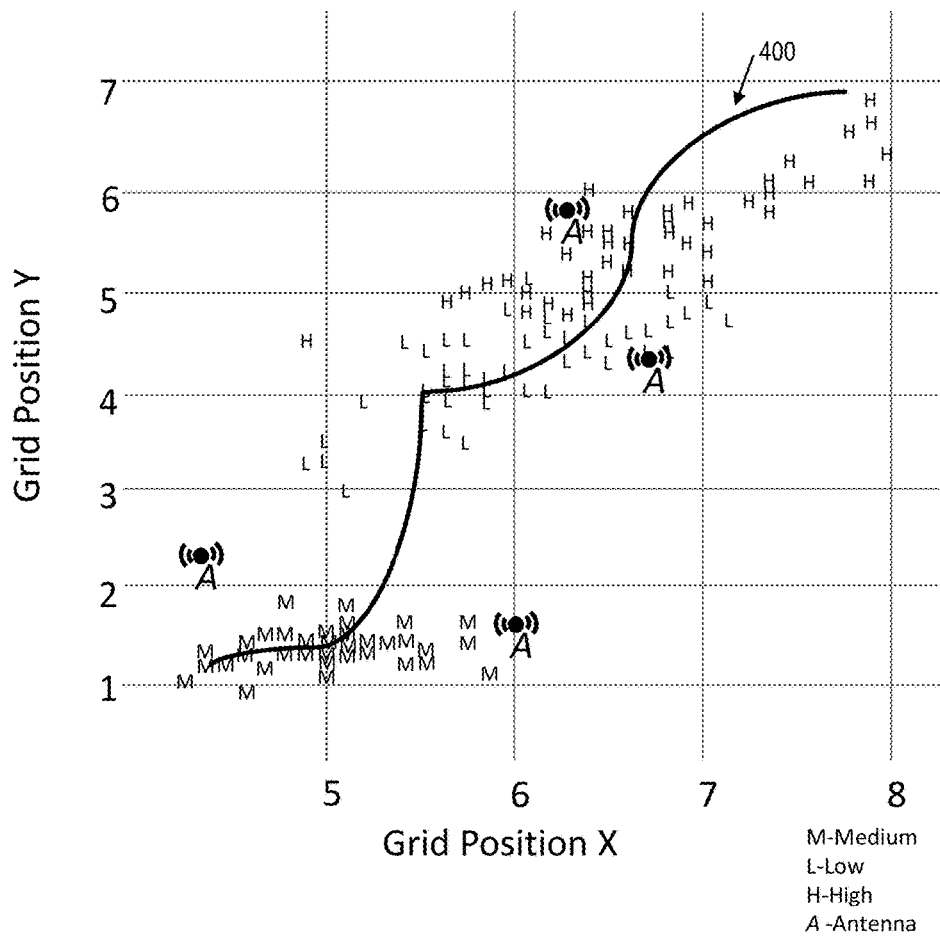
FIG. 6 illustrates optimal locations of network antennas along the fitted curve of FIG. 4B, generated in accordance with embodiment of the invention.

FIG. 6 illustrates optimal locations of network antennas A (e.g., mobile base stations 63) along the fitted curve 400 of FIG. 4B based on the inferences of step 305 of FIG. 3. In this example, the QoE server 60 generates the graph of FIG. 6, illustrating that an event of interest requires four portable massive antenna arrays (e.g., mobile base stations 63) at different locations within a geo-spatial boundary, in order to provide optimal QoE for network users at the event of interest.

Figure 7:
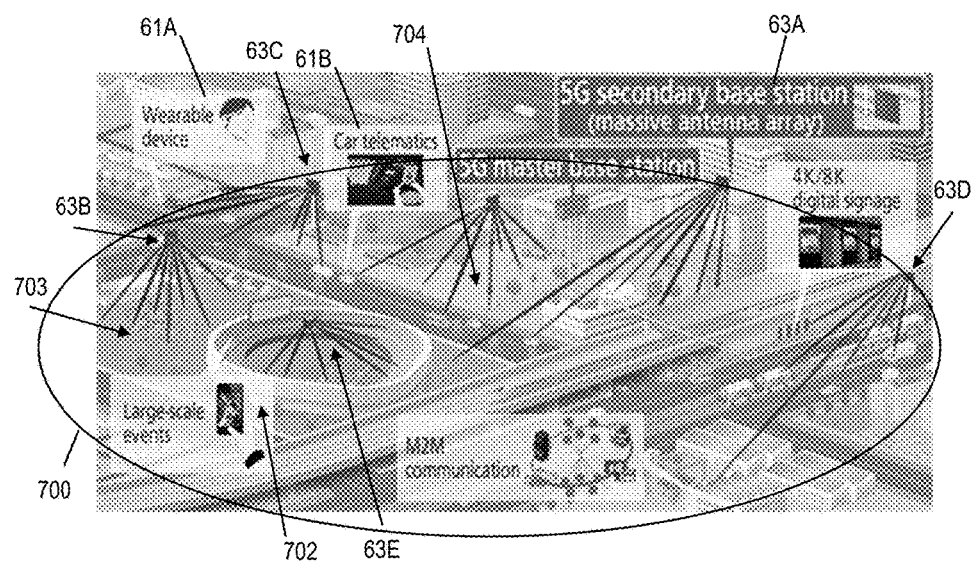
FIG. 7 illustrates an exemplary use scenario in accordance with embodiments of the invention.

FIG. 7 illustrates an exemplary use scenario wherein the QoE server 60 determines optimal locations of mobile base stations based on network usage information associated with an event of interest at a locations indicated at 700. In this example, a geo-spatial boundary 700 encompasses a large-scale event at a venue 702, including a parking lot 703 and surrounding adjacent grounds represented at 704. Moreover, a master base station 62 is shown, as well as a secondary or mobile base station in the form of a massive antenna array 63A. In the example of FIG. 7, the QoE server 60 (depicted in FIG. 2) obtains social user data from user mobile devices (e.g., wearable device 61A, car telematics 61B) at the large scale event. Social user data is obtained in accordance with step 300 of FIG. 3. The QoE server 60 determines bandwidth usage of mobile devices (e.g., wearable device 61A and car telematics 61B) within the geo-spatial boundary 700, obtains crowd density and traffic pattern data (e.g., GPS data from mobile devices within the geo-spatial boundary 700), determines movement data, and derives a SBDM based on the bandwidth and movement data, in accordance with steps 301-304 of FIG. 3. In accordance with step 304 of FIG. 3, the QoE server 60 infers QoE bandwidth requirements for the geo-spatial boundary 700, and generates a notification indicating that four additional mobile antenna stations represented at 63B-63E are needed in order to provide the functionality and quality desired for the wireless network servicing the large scale event of interest.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for determining hardware requirements for a wireless network event using crowdsourcing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining, by a computing device, social user data over a period of time from a plurality of mobile devices associated with a social event at a location;
   obtaining, by the computing device, bandwidth usage data for each of the plurality of mobile devices based on the social user data;

obtaining, by the computing device, crowd density and traffic pattern data related to the social event;

determining, by the computing device, participant movement data for the social event based on the crowd density and traffic pattern data;

deriving, by the computing device, a social bandwidth density model based on the bandwidth usage data and the participant movement data; and determining, by the computing device, bandwidth requirements within a geo-spatial boundary associated with the social event from the social bandwidth density model.

2. The computer-implemented method of claim 1, further comprising generating, by the computing device, a notification regarding deployment of one or more mobile base stations at the social event based on the determined bandwidth requirements.

3. The computer-implemented method of claim 2, further comprising sending, by the computing device, the notification to a remote computing device.

4. The computer-implemented method of claim 1, wherein the social user data comprises data regarding digital content usage for each of the plurality of mobile devices.

5. The computer-implemented method of claim 1, wherein the obtaining the crowd density and traffic pattern data comprises receiving global positioning system data from the plurality of mobile devices.

6. The computer-implemented method of claim 1, wherein:
the obtaining the crowd density and traffic pattern data comprises accessing historic crowd density and traffic pattern data; and
the determining the participant movement data for the social event is based on the historic crowd density and traffic pattern data.

7. The computer-implemented method of claim 6, wherein the obtaining the crowd density and traffic pattern data further comprises determining, by the computing device, that a historic event is similar to the social event, wherein the historic crowd density and traffic pattern data is derived from the historic event.

8. A computer program product comprising a computer readable storage medium having program instructions embodied therewith, the program instructions executable by a computing device to cause the computing device to:
obtain crowd sourced social user data over a period of time from a plurality of mobile devices associated with a social event at a location, wherein the social user data comprises data regarding the use of digital content for each of the plurality of mobile devices;
obtain bandwidth usage data including an amount of bandwidth utilized by each of the plurality of mobile devices during the use of digital content;
generate participant movement data for the social event indicating the movement of participants at the location;
derive a social bandwidth density model based on the bandwidth usage data and the participant movement data; and
determine bandwidth requirements within a geo-spatial boundary associated with the social event from the social bandwidth density model.

9. The computer program product of claim 8, wherein the program instructions further cause the computing device to generate a notification regarding deployment of one or more mobile base stations at the social event based on the determined bandwidth requirements.

10. The computer program product of claim 9, wherein the program instructions further cause the computing device to send the notification to a remote computing device.

11. The computer program product of claim 8, wherein the data regarding the use of digital content is selected from the group consisting of: data regarding digital video streaming, data regarding social messaging, data regarding digital picture uploading, and combinations thereof.

12. The computer program product of claim 8, wherein the program instructions further cause the computing device to obtain crowd density and traffic pattern data, and wherein the obtaining the crowd density and traffic pattern data comprises receiving global positioning system data from the plurality of mobile devices.

13. The computer program product of claim 8, wherein the program instructions further cause the computing device to obtain crowd density and traffic pattern data, and wherein the obtaining the crowd density and traffic pattern data comprises accessing historic crowd density and traffic pattern data, and the generating the participant movement data for the social event is based on the historic crowd density and traffic pattern data.

14. The computer program product of claim 13, wherein the obtaining the crowd density and traffic pattern data further comprises determining that a historic event is similar to the social event, wherein the historic crowd density and traffic pattern data is derived from the historic event.

15. A system comprising:
a processor, a computer readable memory and a computer readable storage medium associated with a computing device;
program instructions to obtain crowd sourced social user data over a period of time from a plurality of mobile devices associated with a social event at a location, wherein the social user data indicates a manner in which each of the plurality of mobile devices is utilizing bandwidth of a mobile network;
program instructions to obtain bandwidth usage data indicating the amount of bandwidth utilized by each of the plurality of mobile devices based on the social user data;
program instructions to obtain crowd density and traffic pattern data related to the social event;
program instructions to determine participant movement data for the social event based on the crowd density and traffic pattern data;
program instructions to derive a social bandwidth density model based on the bandwidth usage data and the participant movement data; and
program instructions to determine bandwidth requirements within a geo-spatial boundary associated with the social event from the social bandwidth density model,
wherein the program instructions are stored on the computer readable storage medium for execution by the processor via the computer readable memory.

16. The system of claim 15, further comprising:
program instructions to generate a notification regarding deployment of one or more mobile base stations at the social event based on the determined bandwidth requirements; and
program instructions to send the notification to a remote computing device.

17. The system of claim 15, wherein the social user data comprises data selected from the group consisting of: data regarding digital video streaming, data regarding social messaging, data regarding digital picture uploading, and combinations thereof.

18. The system of claim 15, wherein the obtaining the crowd density and traffic pattern data comprises receiving global positioning system data from the plurality of mobile devices.

19. The system of claim 15, wherein:
- the obtaining the crowd density and traffic pattern data comprises accessing historic crowd density and traffic pattern data; and
- the determining the participant movement data for the social event is based on the historic crowd density and traffic pattern data.

20. The system of claim 19, wherein the obtaining the crowd density and traffic pattern data further comprises determining that a historic event is similar to the social event, wherein the historic crowd density and traffic pattern data is derived from the historic event.

\* \* \* \* \*